(12) United States Patent
Januschevski et al.

(10) Patent No.: US 9,327,605 B2
(45) Date of Patent: May 3, 2016

(54) METHOD FOR CHARGING A TRACTION BATTERY USING A THREE PHASE SOURCE

(75) Inventors: Robert Januschevski, Tettnang (DE); Juergen Kett, Mannheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 330 days.

(21) Appl. No.: 13/884,372

(22) PCT Filed: Nov. 7, 2011

(86) PCT No.: PCT/EP2011/069544
§ 371 (c)(1),
(2), (4) Date: May 9, 2013

(87) PCT Pub. No.: WO2012/072378
PCT Pub. Date: Jun. 7, 2012

(65) Prior Publication Data
US 2013/0234665 A1   Sep. 12, 2013

(30) Foreign Application Priority Data
Dec. 3, 2010   (DE) .......................... 10 2010 062 376

(51) Int. Cl.
*B60L 11/18*   (2006.01)
(52) U.S. Cl.
CPC ......... *B60L 11/1811* (2013.01); *B60L 11/1814* (2013.01); *B60L 11/1816* (2013.01); *B60L 2220/54* (2013.01); *Y02T 10/641* (2013.01);
(Continued)
(58) Field of Classification Search
CPC ....................................................... B60L 11/18
USPC ........................................................... 320/109
See application file for complete search history.

(56) References Cited

U.S. PATENT DOCUMENTS

| 5,412,268 | A | 5/1995 | Arnaud et al. |
| 5,485,064 | A | 1/1996 | Arnaud et al. |
| 5,504,414 | A * | 4/1996 | Kinoshita ..................... 180/65.8 |

(Continued)

FOREIGN PATENT DOCUMENTS

| DE | 41 07 391 A1 | 9/1992 |
| DE | 195 32 477 A1 | 3/1996 |

(Continued)

OTHER PUBLICATIONS

German Search Report dated Dec. 3, 2010 for corresponding German Application No. 10 2010 062 376.8.
(Continued)

*Primary Examiner* — Drew A Dunn
*Assistant Examiner* — Harry O'Neill-Becerril
(74) *Attorney, Agent, or Firm* — Davis & Bujold P.L.L.C.; Michael J. Bujold

(57) ABSTRACT

The present method relates to a method of charging a traction battery of a vehicle from an external AC power supply system. The traction battery is coupled, via an inverter, to an electric alternating-field machine such that the AC power supply can be connected to the phase windings of the alternating-field machine. The method includes a step of synchronizing the rotational speed of the alternating-field machine with the frequency of the AC power supply. Then the AC power supply is connected to the phase windings of the alternating-field machine and the inverter, which is electrically coupled to the alternating-field machine, is operated as a step-up converter.

11 Claims, 2 Drawing Sheets

Figure 1:
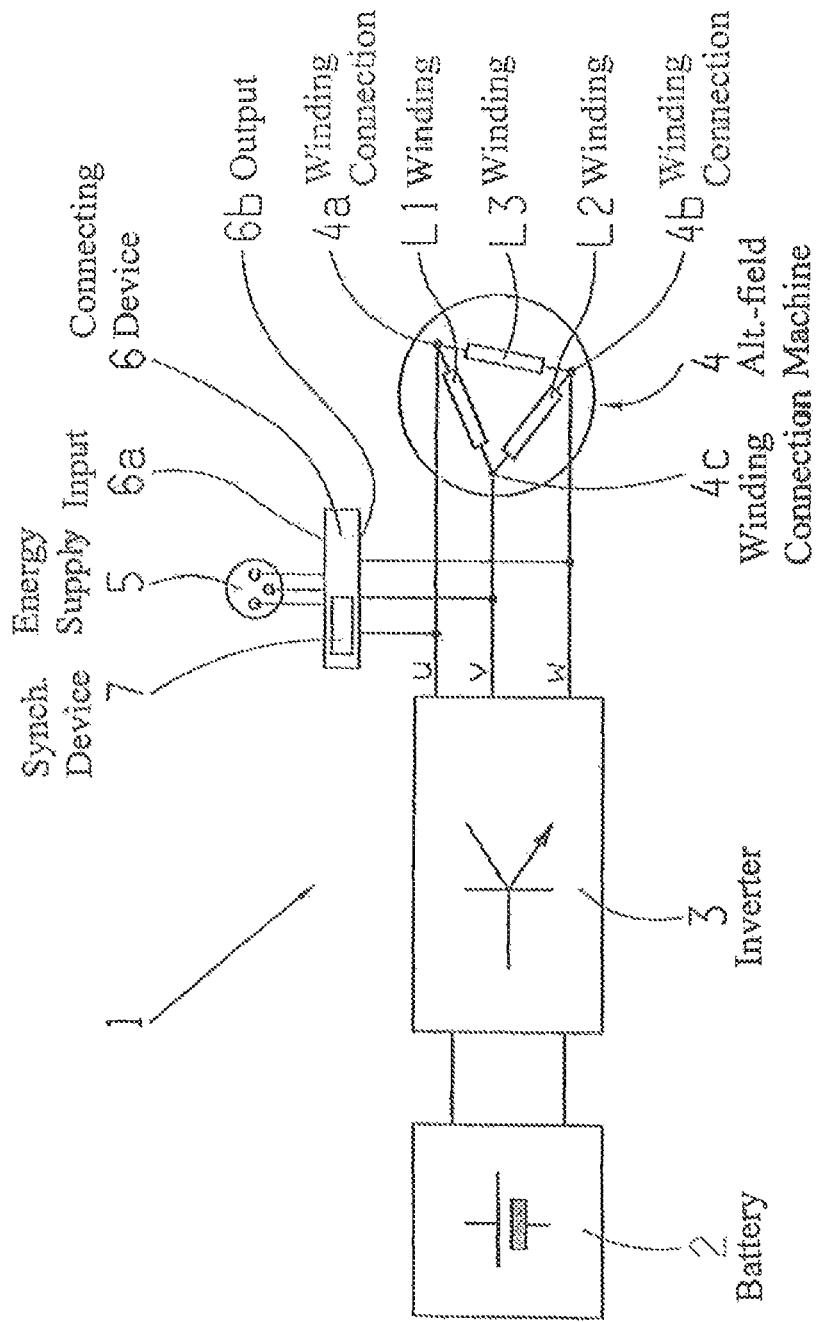

(52) U.S. Cl.
CPC ............ *Y02T 10/7005* (2013.01); *Y02T 90/127* (2013.01); *Y02T 90/14* (2013.01)

(56) References Cited

U.S. PATENT DOCUMENTS

| | | | |
|---|---|---|---|
| 5,629,603 A | | 5/1997 | Kinoshita |
| 5,654,624 A | | 8/1997 | Schroderus |
| 6,018,225 A | * | 1/2000 | Garces ........................ 318/798 |
| 2010/0090626 A1 | * | 4/2010 | King ............................ 318/376 |
| 2011/0029179 A1 | * | 2/2011 | Miyazaki et al. ............... 701/22 |
| 2011/0248563 A1 | | 10/2011 | Komma et al. |

FOREIGN PATENT DOCUMENTS

| | | |
|---|---|---|
| DE | 693 03 150 T2 | 2/1997 |
| DE | 692 20 003 T2 | 11/1997 |
| DE | 196 52 950 A1 | 7/1998 |
| DE | 10 2007 030 634 A1 | 1/2009 |
| DE | 10 2008 063 465 A1 | 6/2010 |
| EP | 08 49 112 A1 | 6/1998 |
| WO | 2010/012924 A2 | 2/2010 |
| WO | 2010/119460 A1 | 10/2010 |

OTHER PUBLICATIONS

International Search Report dated Mar. 14, 2012 for corresponding PCT application No. PCT/EP2011/069544.

Written Opinion for corresponding PCT application No. PCT/EP2011/069544.

International Preliminary Report on Patentability dated May 11, 2012 for corresponding PCT application No. PCT/EP2011/069544.

\* cited by examiner

METHOD FOR CHARGING A TRACTION BATTERY USING A THREE PHASE SOURCE This application is a national stage completion of PCT/EP2011/069544 filed Nov. 7, 2011 which claims priority from German Application Serial No. 10 2010 062 376.8 filed Dec. 3, 2010.

FIELD OF THE INVENTION

The present invention concerns a method for charging a traction battery.

BACKGROUND OF THE INVENTION

In the prior art it is known, for example from the documents DE 196 52 950 A1 or EP 0 849 112 A1, to charge a traction battery by means of the on-board drive system of a motor vehicle at an external AC or three-phase current source. In this case the inverter of the drive system is used as a step-up converter in the direction toward the battery. When an asynchronous machine is used as the drive aggregate, then—to avoid a high reactive power demand—the machine is idled during the charging process and can advantageously be used to lower the power supply voltage, for example by means of suitable winding taps, i.e. so as not to endanger the battery. The short-circuited rotor winding or short-circuited rotor of the asynchronous machine is opened by means of switches for charging the battery.

The disadvantage of the arrangement adopted in the prior art is that switches have to be provided which, when the traction battery is to be charged, interrupt the otherwise short-circuited rotor winding. Such power switches incur additional costs and add to the weight.

SUMMARY OF THE INVENTION

Starting from there the purpose of the present invention is to overcome the disadvantages of the prior art mentioned above and to propose a method for charging a traction battery which enables such switches to be omitted.

According to the invention, a method is proposed for charging a traction battery, in particular of a motor vehicle, from an AC power supply system, in particular a three-phase power supply, in which the traction battery to be charged is coupled, via an inverter, to an electric alternating-field machine, wherein the AC power supply can be connected to the phase windings of the alternating-field machine and, in a first step, the rotational speed of the alternating-field machine is synchronized with the frequency of the AC power supply; and wherein, in a second step, the AC power supply is connected to the phase windings of the alternating-field machine and the inverter electrically coupled to the alternating-field machine is operated as a step-up converter. In this case the phase windings are in particular feeder phase windings of the alternating-field machine.

According to one aspect of the method according to the invention, in the first step the inverter drives or feeds the alternating-field machine for the purpose of synchronization, in particular by means of the traction battery.

According to a further aspect of the method according to the invention, in the second step the inverter works as a step-up converter in the direction toward the traction battery.

According to still another aspect of the method according to the invention, before the first step, the alternating-field machine is separated from a drive-train, in particular a drive-train of a motor vehicle, and further, specifically by means of a separator clutch.

According to the invention, a method is also proposed such that after the first step, the electric alternating-field machine is operated in an idling mode.

Furthermore, according to the invention a method is proposed in which the electric alternating-field machine is designed as an asynchronous machine, in particular with delta-connected phase windings.

According to an aspect of the method according to the invention, the AC power supply is connected to the phase windings at a synchronous point, in particular by means of a synchronizing device and/or a connecting device.

According to a further aspect of the method according to the invention, in the second step the inverter is fed from the alternating-field machine, in particular by means of a winding tap on a phase winding, with a voltage at least at times reduced by comparison with the voltage.

According to yet another aspect of the method according to the invention, the peak value of the reduced voltage is lower than the battery voltage of the traction battery.

According to the invention a device is also proposed for carrying out the method according to the invention, in particular for use on a motor vehicle.

Further features and advantages of the invention emerge from the following description of example embodiments of the invention, given with reference to the figures in the drawings, which show details essential to the invention. The individual features can each be implemented in isolation as such, or more than one at a time in any desired combination in variants of the invention.

BRIEF DESCRIPTION OF THE EMBODIMENTS

Below, example embodiments of the invention are explained in more detail with reference to the attached drawings, which show:

FIG. 1: An example of a device for carrying out the method according to the invention in accordance with a possible embodiment of the invention; and FIG. 2: An example of a device for carrying out the method according to the invention in accordance with another possible embodiment of the invention.

DETAILED DESCRIPTION OF THE EMBODIMENTS

In the figure descriptions below, the same elements or functions are given the same indexes.

Figure 2:
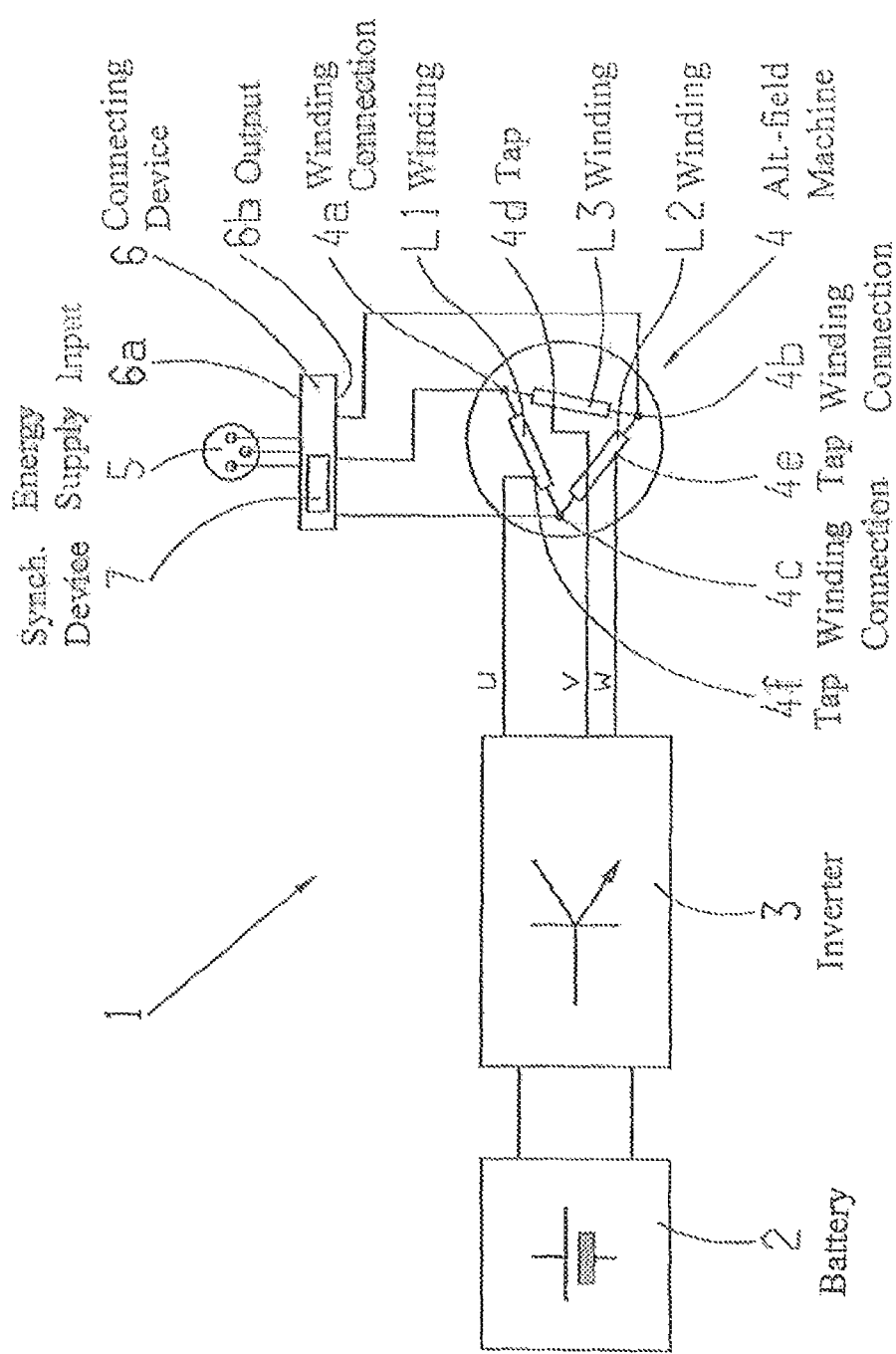

FIGS. 1 and 2 show respective examples of a device 1 according to the invention for charging a battery or traction battery 2, the device being designed for carrying out the method according to the invention. In this case the traction battery 2 is in particular part of the device 1.

The traction battery 2 to be charged is in the form of a rechargeable battery or accumulator, for example with one or more battery cells. The battery cells forming the traction battery 2 can be connected together for example in parallel or in series, for example having a common output. Alternatively, instead of the traction battery 2 according to the invention some other energy storage element, for example a SuperCap, can be charged by means of the device 1.

The traction battery 2 is coupled or functionally connected by means of or via an inverter 3 of the device 1 to an electric alternating-field machine 4 of the device 1, in particular a three-phase machine and in particular an asynchronous machine. The asynchronous machine 4 is in particular in the form of a short-circuited rotor asynchronous machine 4, preferably with a cage rotor.

The inverter 3 is in particular a pulse inverter and is provided in order to feed or control the alternating-field machine 4 for drive purposes in a suitable manner, for example with PWM, and to feed energy recovered from the electric alternating-field machine 4 for example back into the traction battery 2 in a suitable manner. In this case the inverter 3, which co-operates in particular with a control unit (not shown), is in the usual manner formed by a number of bridge branches, for example by a B6-bridge circuit. In each bridge branch are arranged two switches, for example MOSFETs or IGBTs, and in each case an anti-parallel freewheeling diode is associated with the respective switches.

By way of the bridge mid-point between the switches of each bridge branch, the inverter 3 is electrically coupled to the alternating-field machine 4. For this purpose the inverter 3 is or can be connected in an electrically conducting manner to the phase windings L1, L2, L3 of the alternating-field machine 4 provided for electrically feeding the alternating-field machine 4, which are in particular phase windings L1, L2, L3 of the stator thereof, i.e. on the alternating voltage side. In this case the phase windings L1, L2, L3 are feeder phase windings inasmuch as they provide an energy input for operating or for driving the alternating-field machine 4.

The inverter 3 is in particular coupled to the connection terminals 4a, 4b, 4c of the respective phase windings L1, L2, L3 (as in FIG. 1) or, for example, to winding taps 4d, 4e, 4f on the respective phase windings L1, L2, L3 (as in FIG. 2), for example by way of the connecting lines u, v, w in each case. In the case of an asynchronous machine 4, the inverter 3 is, in particular, coupled to phase windings L1, L2, L3 in delta connection, i.e. to stator windings of the asynchronous machine 4.

In the context of the present invention the traction battery 2, the inverter 3 and the electric machine 4 are in particular all parts of an electrical drive system, for example a hybridized drive system, in particular of a motor vehicle.

According to the invention the device 1 is designed to be connected to an external AC power supply system, in particular a three-phase power supply, in order to charge the traction battery 2. Such an AC power supply can for example be provided on an energy supply device 5, for example at a charging station, such an energy supply device 5 in particular providing a stationary external AC power supply and in particular a three-phase power supply. The voltage that can be supplied by the AC power supply system may be for example 230 V or 400 V.

For its connection, specifically according to the invention, to the stationary energy supply device 5 or to the AC power supply provided on it, the device 1 comprises for example a switch or connecting device 6 which has an electrical input 6a for connecting to the external energy supply device 5 or the external AC power supply system, and which on the output side, i.e. at an electrical output 6b, is or can be electrically coupled, i.e. connected or connectable in an electrically conducting manner, to the phase windings L1, L2, L3 of the alternating-field machine 4.

The connecting device 6 enables the selective interruption of the electrical connection between its input 6a and its output 6b, that is to say, the connection between the external AC power supply system which is connected to the input 6a and the alternating-field machine 4, i.e. to its phase windings L1, L2, L3, and the disconnection of the AC power supply system therefrom. In particular, when the external AC power supply system is connected to the phase windings L1, L2, L3, it is connected to the terminals 4a, 4b, 4c (FIGS. 1 and 2).

In particular, according to the invention the connecting device 6 is also part of the drive system, although for example it can also be made separately from the latter. Switching processes are carried out by the connecting device 6, for example by way of at least one, in particular, electrically actuated relay.

In the method according to the invention, which can be carried out with the above-described device 1, it is provided that in a first step the rotational speed or frequency of the alternating-field machine 4 is synchronized with the frequency of the AC power supply, i.e. the alternating-field machine 4 is operating and its rotor is turning. For this, the alternating-field machine 4 is controlled by the inverter 3 in a suitable manner, for example by PWM.

For the purposes of synchronization, for example by means of a synchronizing device 7 such as in the form of a shunt connection unit, for example the connecting device 6, various parameters of the AC power supply system and of the alternating-field machine 4 are determined and compared with one another, namely at least the frequency of the AC power supply and the rotational speed or frequency of the alternating-field machine 4 or its rotor. During the synchronization the alternating-field machine 4 is powered by a traction battery 2, in particular the traction battery 2 that is to be charged.

By virtue of the synchronization of the alternating-field machine 4 with the frequency of the AC power supply or three-phase power supply, which in particular always precedes the separation of the alternating-field machine 4 from a drive-train 9, for example a motor vehicle drive-train, for example by means of a separator clutch 10, when the AC power supply is connected or switched to the phase windings L1, L2, L3 of the alternating-field machine, i.e. at the beginning of the second step according to the invention, the alternating-field machine 4 can subsequently be operated free from torque, i.e. in an idling mode by means of the AC power supply. Since according to the invention the alternating-field machine 4 is rotating synchronously with the frequency, for example at 50 Hz, the reactive power demand of the alternating-field machine 4 can further be kept at a low or minimal level, in particular during or for the duration of the charging of the traction battery 2 in the second step.

The connection of the AC power supply to the phase windings L1, L2, L3 in accordance with the second step according to the invention preferably takes place at a synchronous point, that is to say, at a time when the compared parameters of the alternating-field machine 4 and the AC power supply are in agreement to a desired extent. In particular, at the synchronous point or when the rotational speed of the alternating-field machine 4 and the frequency have been synchronized, the external AC power supply system is connected to the alternating-field machine 4, for example in parallel (FIG. 1), specifically in that the connecting device 6 is switched through, i.e. its output 6b and input 6a are connected in an electrically conducting manner.

After the alternating-field machine 4 has been connected to the external AC power supply system, according to the invention the inverter 3 now operates as a step-up converter, i.e. in the direction toward the traction battery. In this case a change of the operating mode of the step-up converter is permitted by the control unit, which in particular co-operates with the connecting device 6.

In order to avoid damaging the traction battery 2, according to the invention it is also provided that the external power supply voltage can be or is reduced, i.e. during the charging of the traction battery 2, the inverter 3 is supplied from the alternating-field machine 4 with an AC voltage lower then the voltage of the external power supply, such that the AC voltage of the AC power supply is transformed to a peak value lower than the traction battery voltage.

For this it is advantageous to use the phase windings L1, L2, L3 of the alternating-field machine 4, which are in particular phase windings on the stator side of an asynchronous machine 4. For example, the inverter 3 is advantageously connected or electrically coupled to the phase windings L1, L2, L3 by way of taps or winding pick-up connectors 4d, 4e, 4f, i.e. with a respective winding tap 4d, 4e, 4f for each of the phase windings L1, L2, L3. In this case the alternating-field machine 4 acts as an economy transformer (FIG. 2). In this, an advantageous smoothing of the currents can be achieved by virtue of the stray inductances.

In this way, in the second step the inverter 3 can be fed or supplied from the alternating-field machine with a lower voltage compared with the AC voltage, the voltage being reduced for at least some of the time. Alternatively for example, a voltage reduction can also be produced by means of galvanically separated stator windings, the voltage reduction taking place by virtue of the winding ratio.

In the method according to the invention the synchronously co-rotating alternating-field machine 4 advantageously supports the external AC power supply in a "generator-like" manner during the step-up converter operation of the inverter 3. This enables a stable and rapid charging process of the traction battery 2. Switches, as in the prior art, are not needed.

INDEXES

1 Device for charging a traction battery
2 Traction battery
3 Inverter
4 Alternating-field machine
4a, b, c Phase winding connection
4d, e, f Winding tap
5 External energy supply device
6 Connecting device
6a Input of 6
6b Output of 6
7 Synchronizing device
u, v, w Connecting lines
L1, L2, L3 Phase winding

The invention claimed is:

1. A method of charging a traction battery (2) of a motor vehicle from an external AC power supply system, in which the traction battery (2) to be charged is coupled, via an inverter (3), to an electric alternating-field machine (4) such that the AC power supply is connectable to phase windings (L1, L2, L3) of the alternating-field machine (4), the method comprising the steps of:
controlling a rotational speed of the alternating-field machine by adjusting, with the inverter, power from the traction battery to the alternating-field machine;
synchronizing the rotational speed of the alternating-field machine (4) with a frequency of the AC power supply;
connecting the AC power supply to the phase windings (L1, L2, L3) of the alternating-field machine (4); and
operating the inverter (3), that is electrically coupled to the alternating-field machine (4), as a step-up converter.

2. The method according to claim 1, further comprising the step of using the inverter (3) to either drive or feed the alternating-field machine (4) by the traction battery (2) for synchronizing the rotational speed of the alternating-field machine.

3. The method according claim 1, further comprising the step of operating the inverter (3) as a step-up converter in a direction toward the traction battery (2).

4. The method according to claim 1, further comprising the step of separating the alternating-field machine (4) from a drive-train of the motor vehicle, via a separator clutch, before synchronizing the rotational speed of the alternating-field machine.

5. The method according to claim 1, further comprising the step of, after synchronizing the rotational speed of the alternating-field machine, operating the alternating-field machine (4) in an idling mode.

6. The method according to claim 1, further comprising the step of designing the alternating-field machine (4) as an asynchronous machine with the phase windings (L1 L2, L3) in a delta connection.

7. The method according to claim 1, further comprising the step of connecting the AC power supply to the phase windings (L1, L2, L3), at a synchronous point, by at least one of a synchronizing device (7) and a connecting device (6).

8. The method according to claim 1, further comprising the step of feeding the inverter (3) with a voltage, via a winding tap (4d, 4e, 4f) on the phase winding (L1, L2, L3), from the alternating-field machine (4) which, at least at times, is lower in comparison with a voltage of the AC power supply.

9. The method according to claim 8, further comprising the step of maintaining a peak value of the reduced voltage lower than a battery voltage of the traction battery (2).

10. A device for charging a traction battery (2) of a motor vehicle, the device comprising:
an external AC power supply,
the traction battery (2) to be charged being coupled, via an inverter (3), to an electric alternating-field machine (4) such that the AC power supply is connectable to phase windings (L1, L2, L3) of the alternating-field machine (4),
a rotational speed of the alternating-field machine (4) being controlled by adjusting, with the inverter, power from the traction battery to the alternating-field machine so as to synchronize the rotational speed of the alternating-field machine with a frequency of the AC power supply,
the AC power supply being connected to the phase windings (L1, L2, L3) of the alternating-field machine (4), and
the inverter (3) being electrically coupled to the alternating-field machine (4) and being operated as a step-up converter.

11. A method of charging a traction battery of a motor vehicle with power from an external AC power supply, the method comprising the steps of:
coupling the traction battery, via an inverter, to an electric alternating-field machine and selectively coupling the AC power supply to phase windings of the alternating-field machine;
determining and comparing, with a synchronization device, a rotational speed of the alternating-field machine and a frequency of the power from the AC power supply;
controlling the rotational speed of the alternating-field machine by adjusting, with the inverter, power from the traction battery to the alternating-field machine so as to synchronize the rotational speed of the alternating-field machine and the frequency of the power from the AC power supply;

coupling the AC power supply to the phase windings of the alternating-field machine; and operating the inverter as a step up converter for directing at least one of the power from the AC power supply and the power from the alternating-field machine to the traction battery.

\* \* \* \* \*